United States Patent
Lee et al.

(10) Patent No.: US 12,046,939 B2
(45) Date of Patent: Jul. 23, 2024

(54) EXPANSION MEMBER FOR PROBE FOR CHARGING AND DISCHARGING BATTERY AND PROBE INCLUDING THE SAME

(71) Applicant: WONIK PNE CO., LTD., Suwon-si (KR)

(72) Inventors: Jeongmok Lee, Suwon-si (KR); Soojeong You, Suwon-si (KR); Woosik Han, Suwon-si (KR)

(73) Assignee: WONIK PNE CO., LTD., Suwon-si (KR)

( * ) Notice: Subject to any disclaimer, the term of this patent is extended or adjusted under 35 U.S.C. 154(b) by 331 days.

(21) Appl. No.: 17/545,800

(22) Filed: Dec. 8, 2021

(65) Prior Publication Data
US 2023/0155405 A1 May 18, 2023

(30) Foreign Application Priority Data

Nov. 15, 2021 (KR) .................. 10-2021-0156566
Nov. 15, 2021 (KR) .................. 10-2021-0156570
Nov. 15, 2021 (KR) .................. 10-2021-0156571

(51) Int. Cl.
*H02J 7/00* (2006.01)
*H01M 50/209* (2021.01)

(52) U.S. Cl.
CPC ......... *H02J 7/0045* (2013.01); *H01M 50/209* (2021.01); *H02J 7/007182* (2020.01)

(58) Field of Classification Search
None
See application file for complete search history.

(56) References Cited

U.S. PATENT DOCUMENTS

| | | | |
|---|---|---|---|
| 5,329,932 A | 7/1994 | Yount | |
| 2013/0244066 A1* | 9/2013 | Kang | ............... H01M 10/6554 429/62 |
| 2015/0171480 A1 | 6/2015 | Seo | |

FOREIGN PATENT DOCUMENTS

WO   2017-069297 A   4/2017

OTHER PUBLICATIONS

Extended European Search Report dated Sep. 15, 2022 as received in application No. 21213338.3.

* cited by examiner

*Primary Examiner* — Arun C Williams
(74) *Attorney, Agent, or Firm* — Maschoff Brennan

(57) ABSTRACT

Disclosed is an expansion member for a probe for battery charging and discharging. The expansion member includes a first fluid accommodation part configured to form a space in which a fluid is introduced and stored and a fluid supply pipe equipped with a path along which the fluid is introduced and discharged and connected to the first fluid accommodation part. The first fluid accommodation part includes a first cover and a second cover. The first cover and the second cover are bonded together to form a first fluid accommodation space in which the fluid is accommodated. The first fluid accommodation space is surrounded by a first junction region in which the first cover and the second cover are bonded together. A penetration hole is formed on the top of the first junction region.

15 Claims, 14 Drawing Sheets

[FIG. 1]
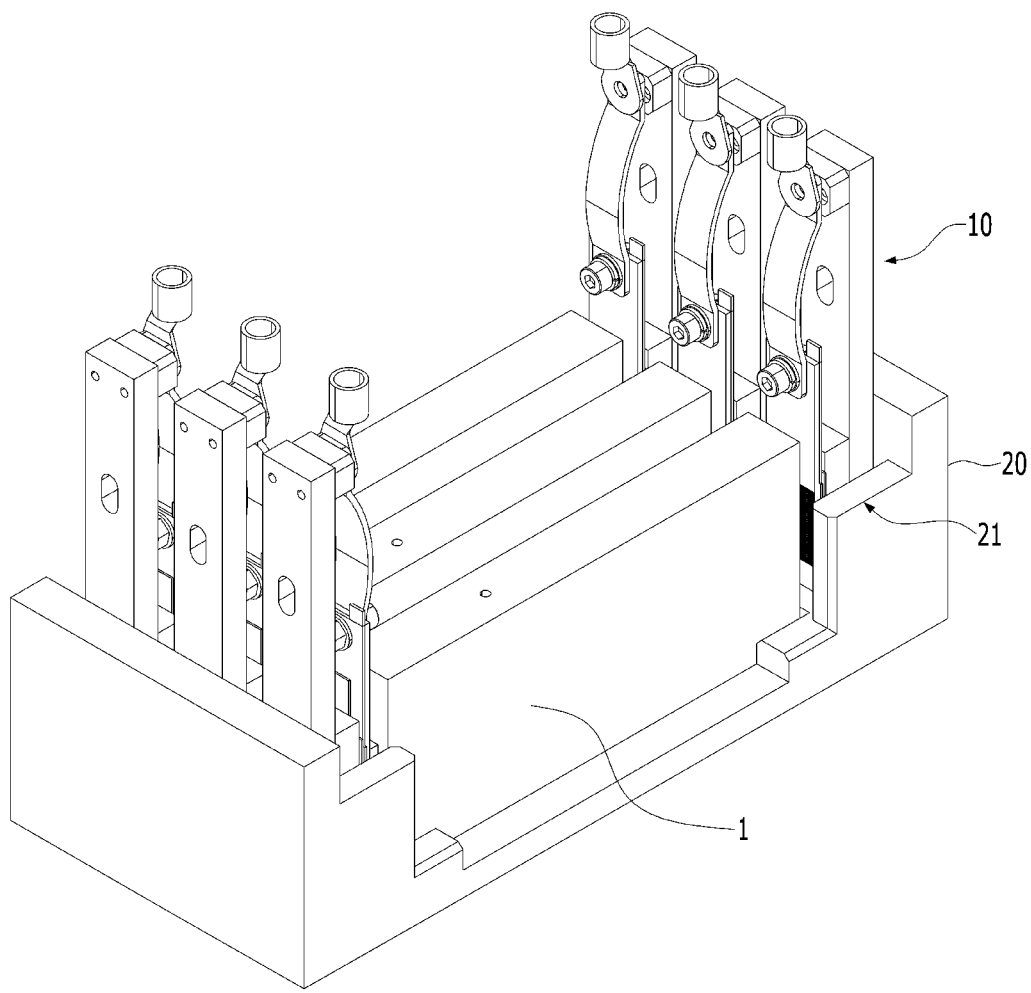

[FIG. 2A]
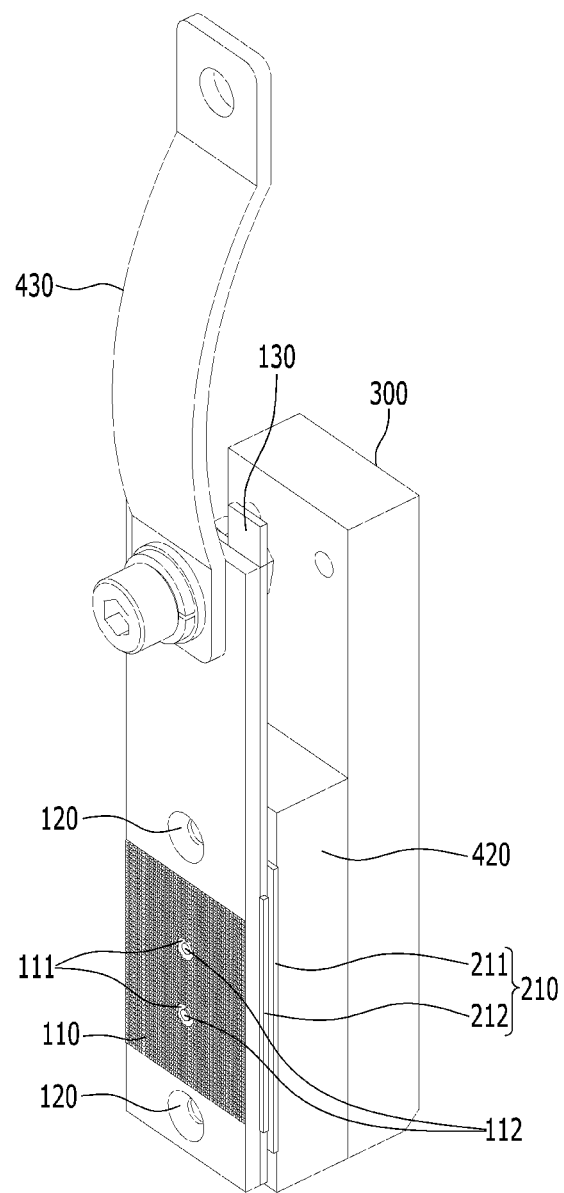

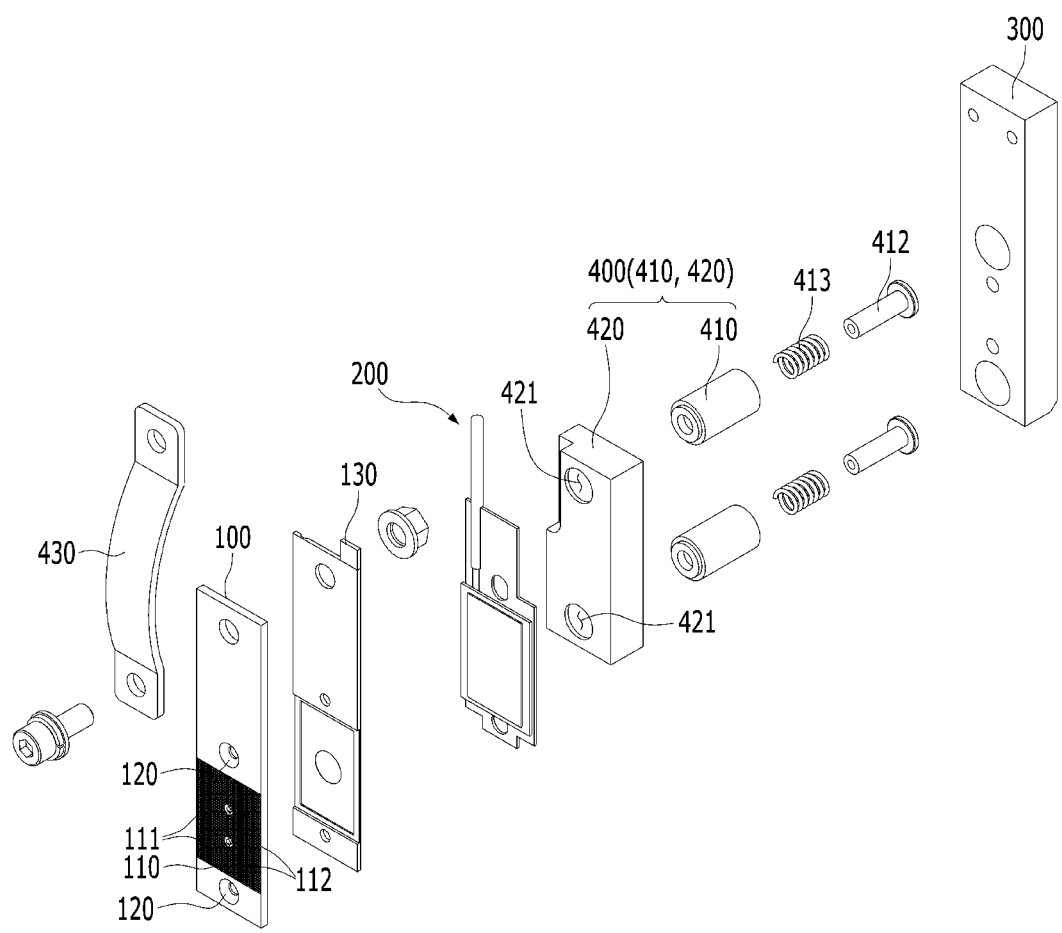
[FIG. 2B]

[FIG. 3A]
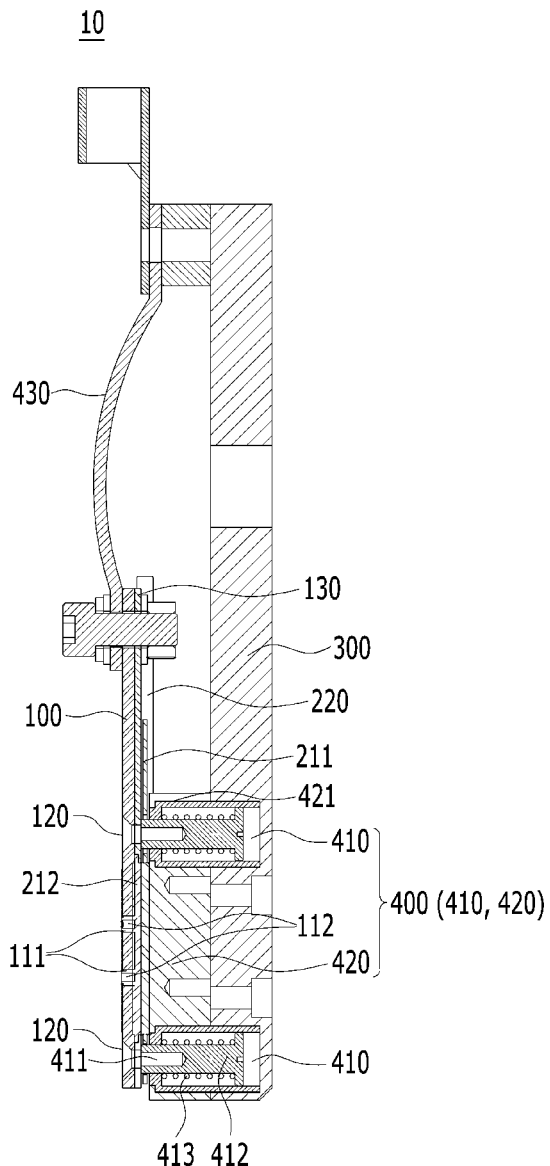
[FIG. 3B]
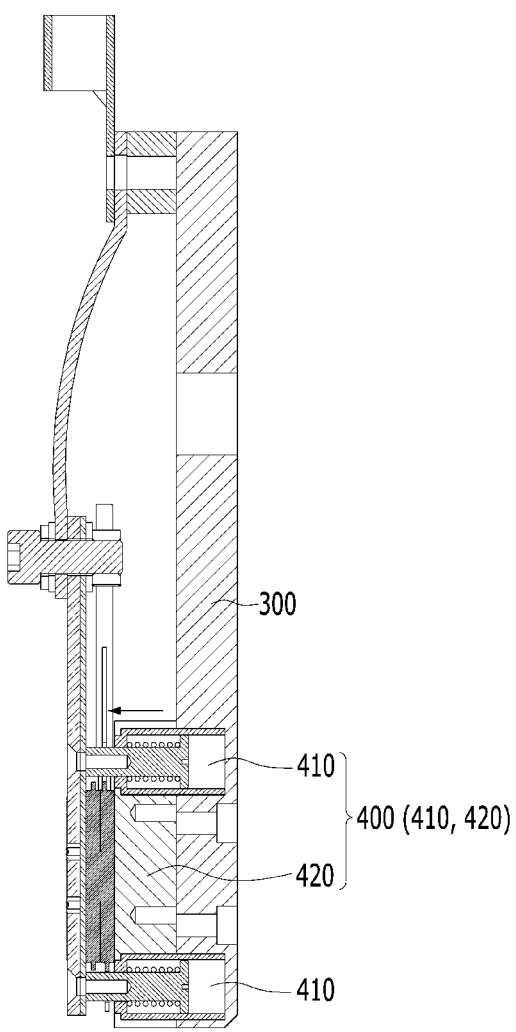

[FIG. 4]
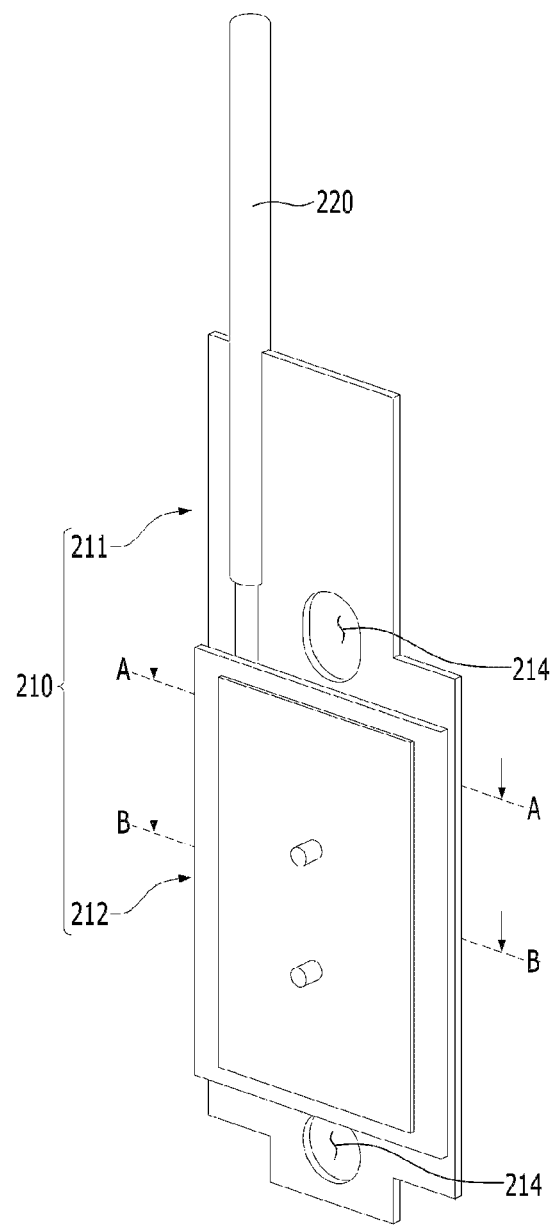

[FIG. 5]
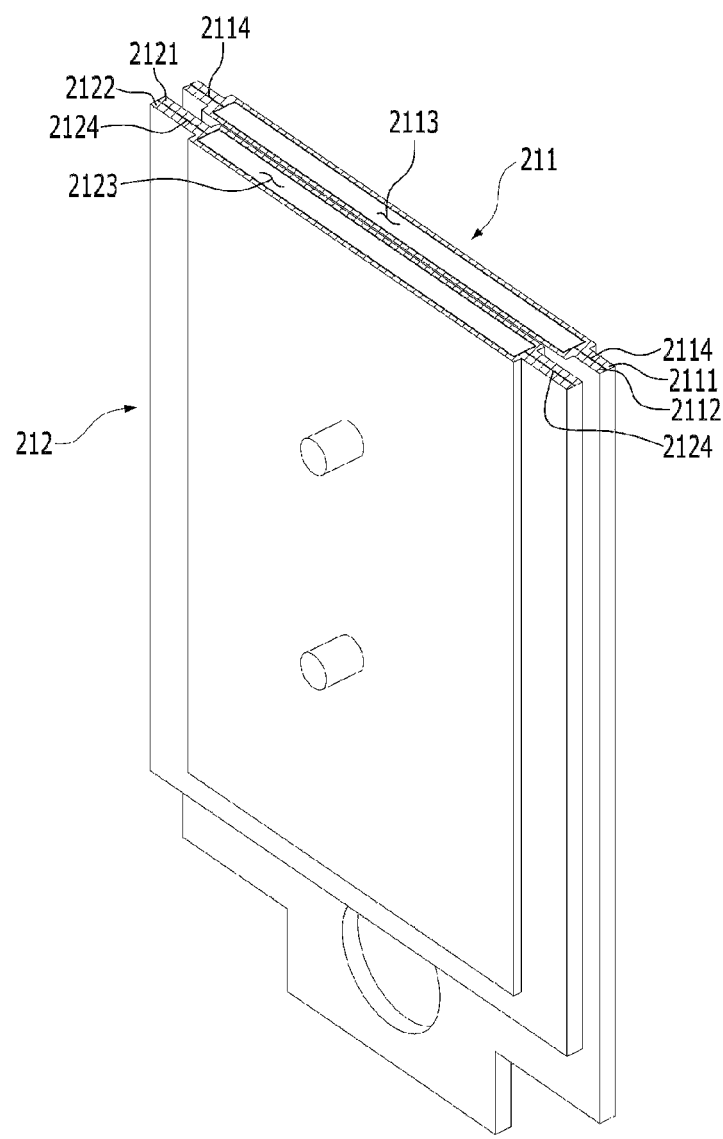

[FIG. 6]
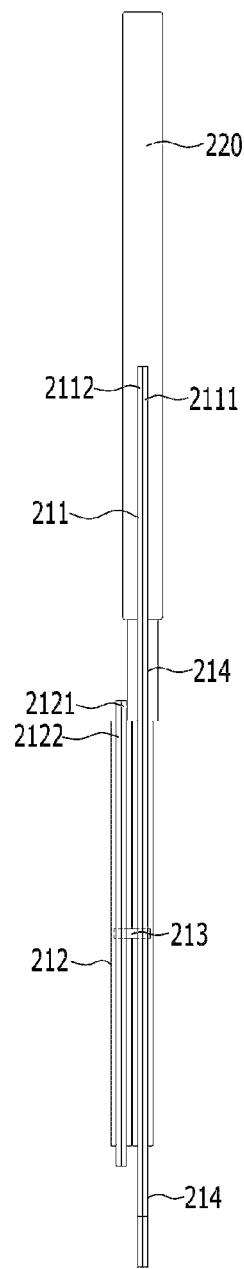

[FIG. 7]
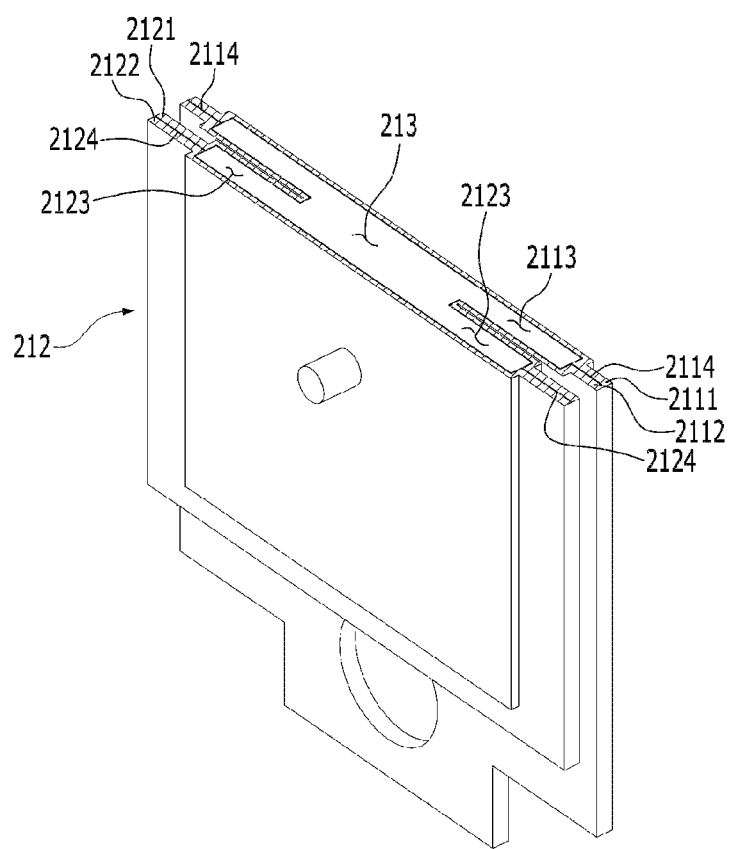

[FIG. 8]
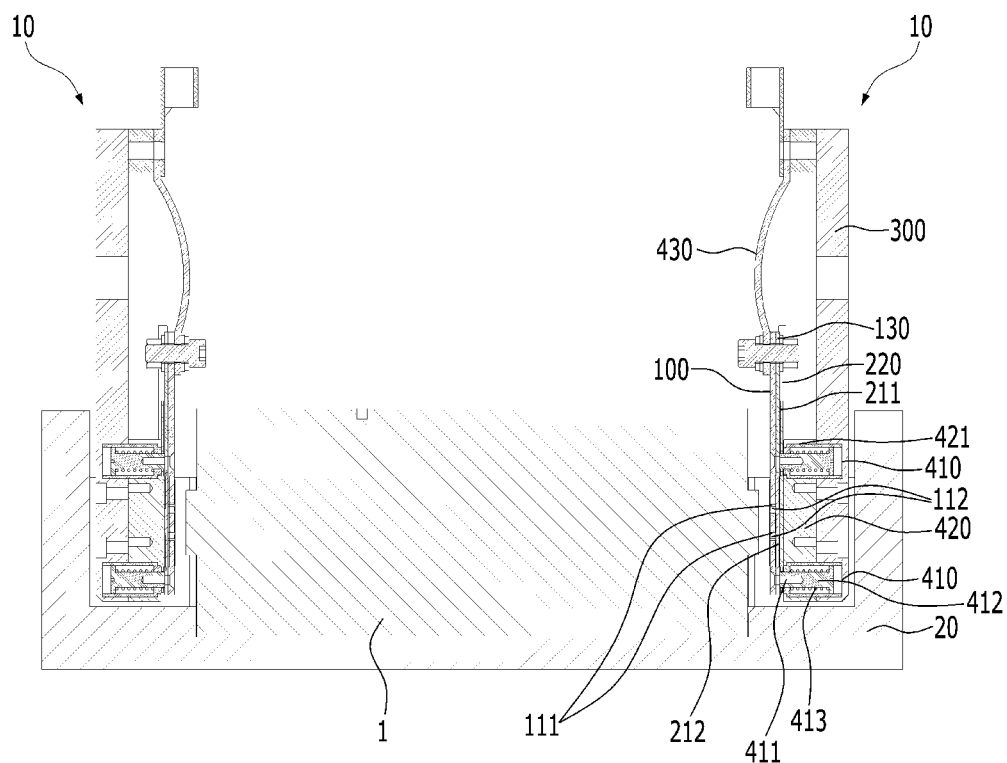

[FIG. 9]
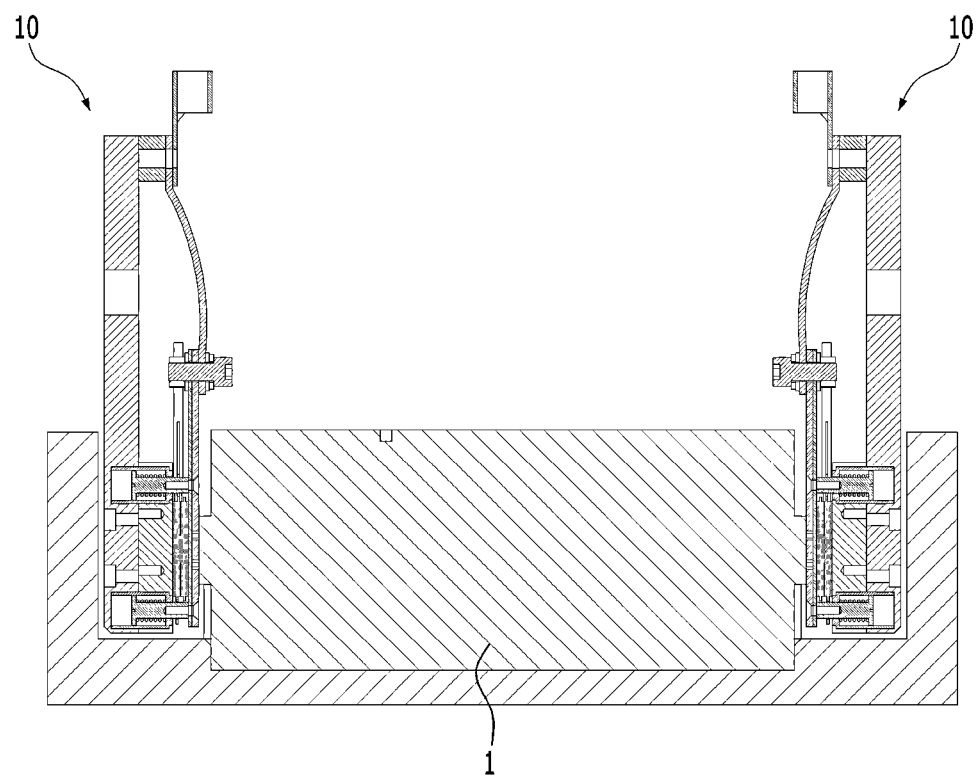
[FIG. 10]
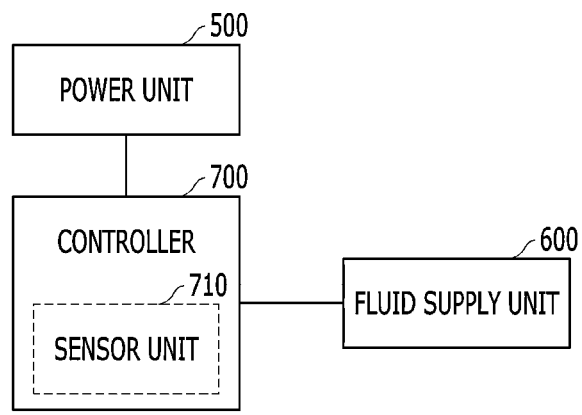

[FIG. 11]
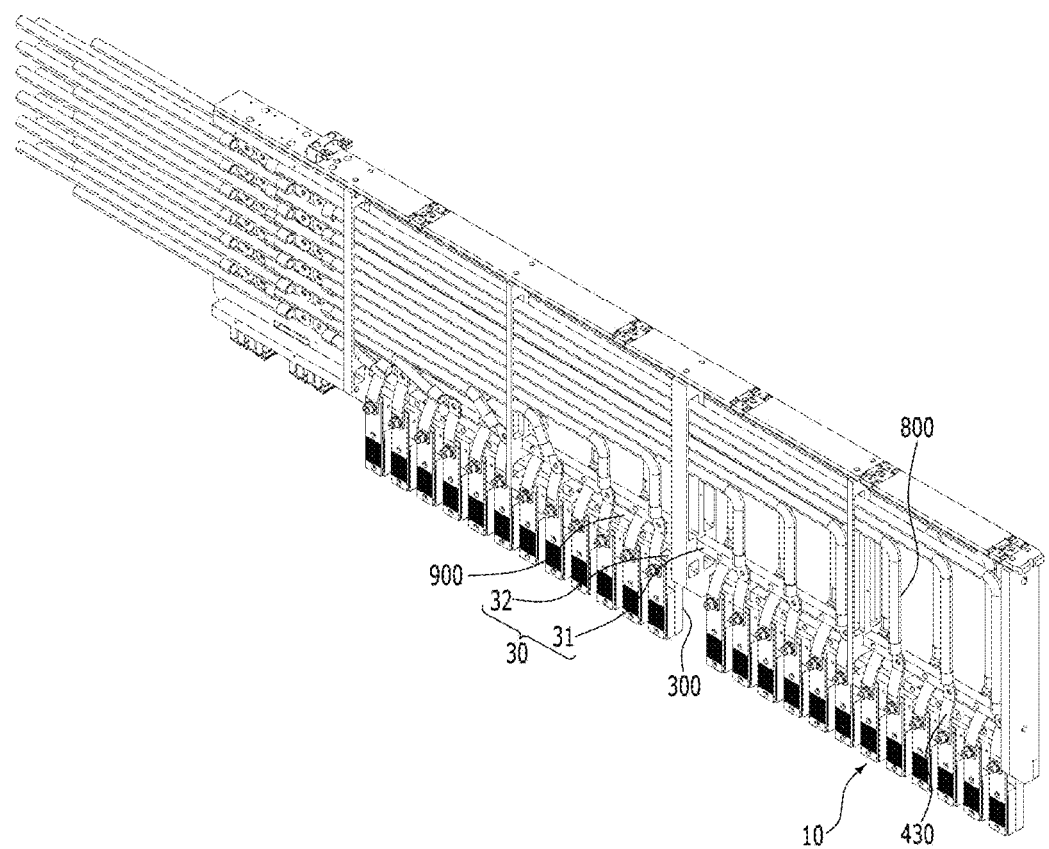

[FIG. 12]
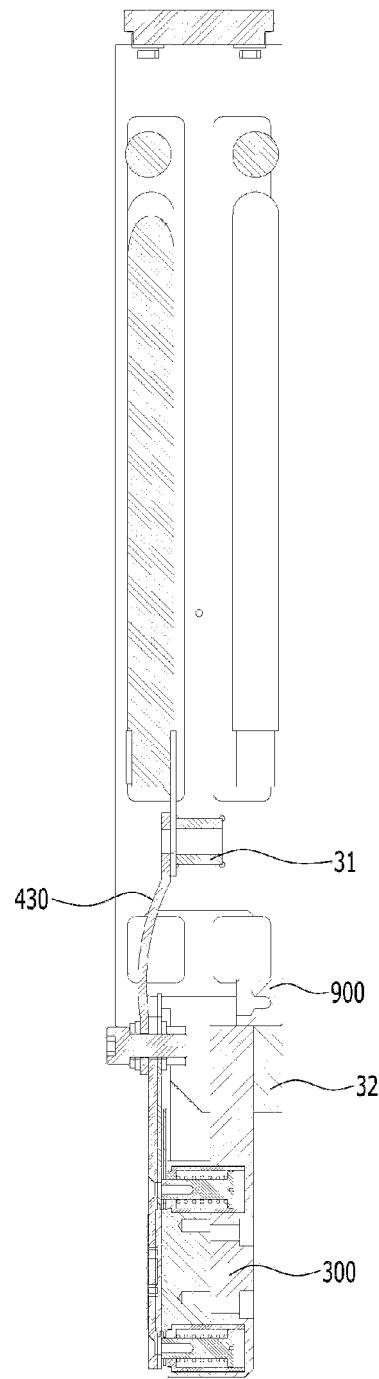

[FIG. 13]
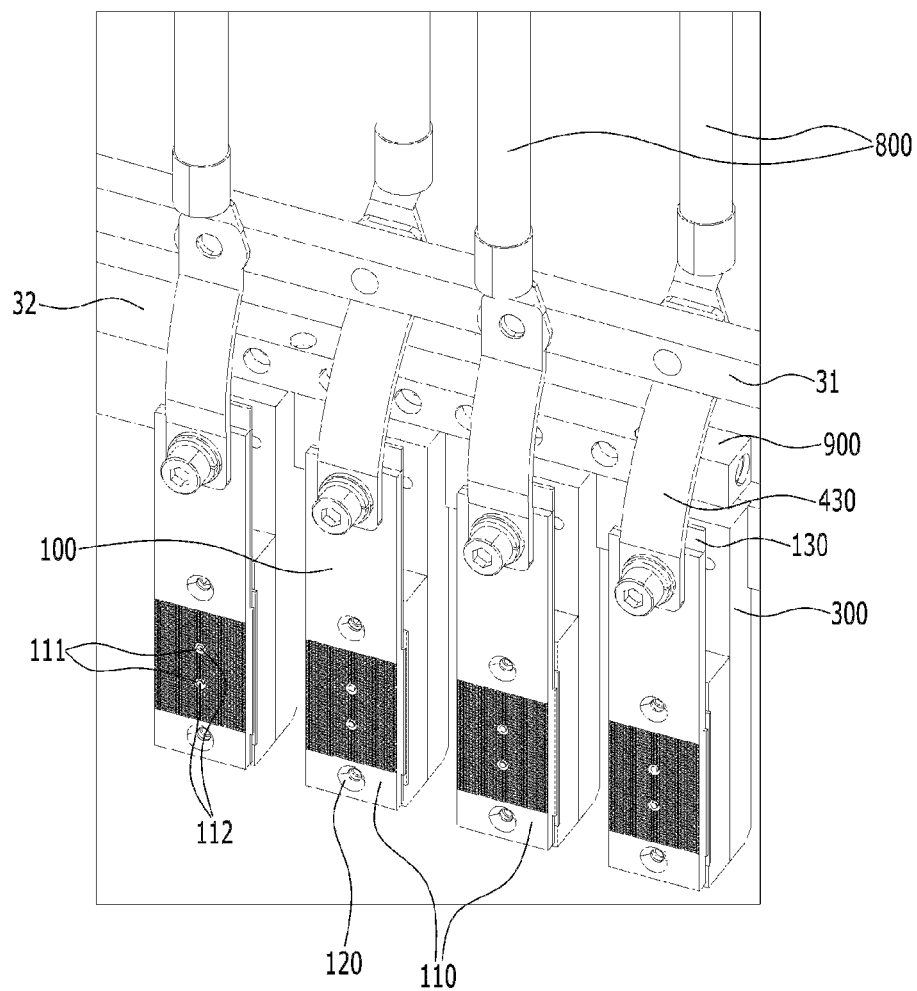

[FIG. 14]
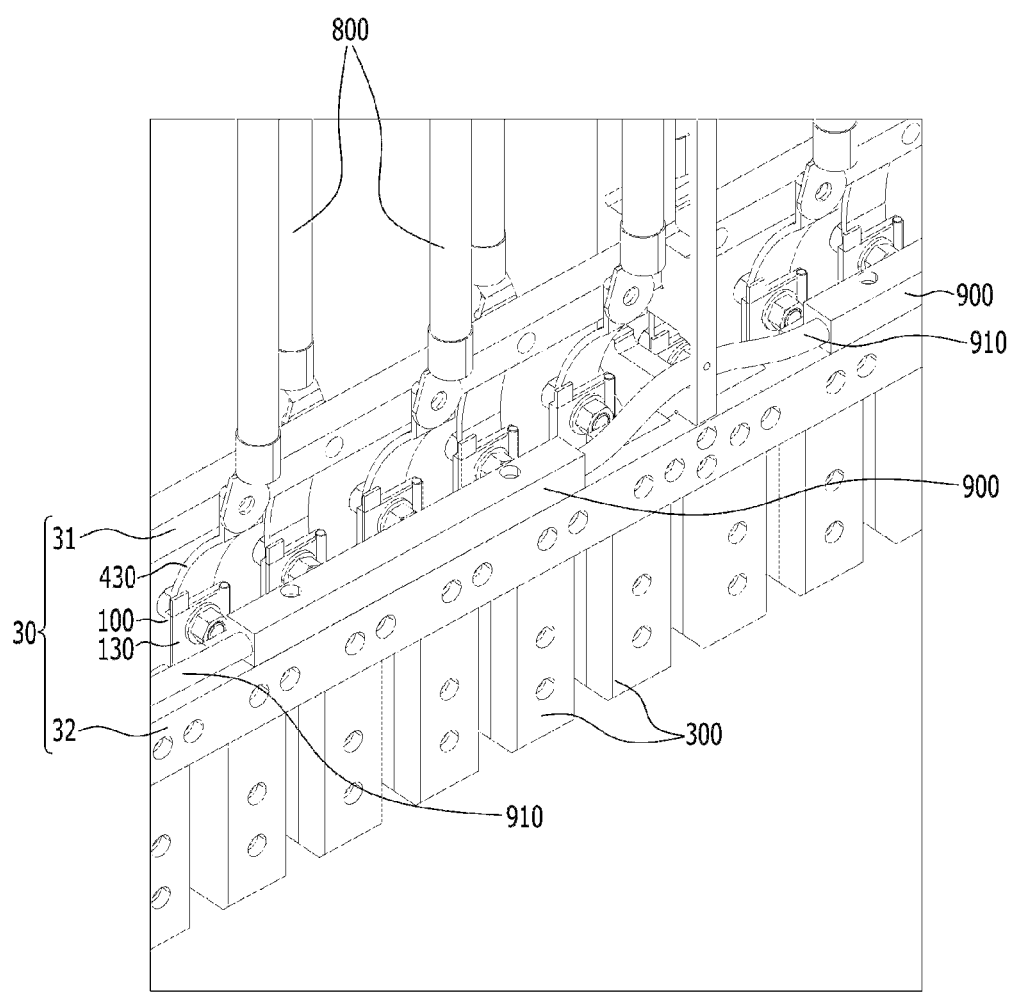

EXPANSION MEMBER FOR PROBE FOR CHARGING AND DISCHARGING BATTERY AND PROBE INCLUDING THE SAME

TECHNICAL FIELD

The present disclosure relates to an expansion member for a probe for battery charging and discharging and a probe including the same, and more particularly, to an expansion member for a probe of a charger and discharger, which can come into contact with posts provided on both sides of a prismatic battery, and a probe including the same.

BACKGROUND ART

In general, a rechargeable battery is a power source for a portable electronic device for information communication, such as a mobile phone, a tablet PC or a notebook computer, an electric bicycle, an electric vehicle, etc., and a demand for the rechargeable battery suddenly increases.

A process of manufacturing the rechargeable battery may be basically divided into an electrode process, a stacking process, an activation process, a test process, etc. The activation process means a process of activating a stacked battery (or a battery cell) so that the stacked battery can be used. Specifically, during the activation process, the battery is charged and discharged by supplying a voltage and a current to the battery.

For the charging and discharging of the battery, after a probe including an electrode is brought into contact with the battery, a current or a voltage is supplied to the electrode included in the battery through the probe. Accordingly, the probe is commonly disposed at a position corresponding to the electrode of the battery.

The battery is divided into a prismatic type, a pouch type and a cylindrical type. Among them, an electrode of the prismatic battery is commonly provided on the top of the battery. In this case, a probe for the charging and discharging of the battery is also disposed on the top of the battery. If the electrode of the prismatic battery is provided on the side of the battery, the probe also needs to be disposed on the side of the battery. However, if the probe is disposed on the side of the battery, it is necessary to efficiently dispose the probe on the side of the battery because there is a good possibility that the probe may interfere with the battery in an arrangement aspect. In particular, if additional pressurization means for bringing the probe into contact with the battery is present, there is a problem in that a space occupied by the probe is increased.

Contents described in "Background Art" help understanding of the background of the present disclosure, and may include contents that are not disclosed conventional technologies.

PRIOR ART DOCUMENT

Patent Document

Korean Patent No. 10-2131506 (Jul. 1, 2020)

DISCLOSURE

Technical Problem

The present disclosure is intended to provide an expansion member included in a probe for battery charging and discharging, which enables a contact with an electrode of the battery without a separate pressurization apparatus.

Furthermore, the present disclosure is intended to provide a probe which enables battery charging and discharging although an electrode of a prismatic battery is disposed on both sides of the prismatic battery which face each other.

Objects to be solved by the present disclosure are not limited to the aforementioned objects, and the other objects not described above may be evidently understood from the following description by those skilled in the art.

Technical Solution

An expansion member for a probe for battery charging and discharging according to an embodiment of the present disclosure includes a first fluid accommodation part configured to form a space in which a fluid is introduced and stored and a fluid supply pipe equipped with a path along which the fluid is introduced and discharged and connected to the first fluid accommodation part. The first fluid accommodation part may include a first cover and a second cover. The first cover and the second cover may be bonded together to form a first fluid accommodation space in which the fluid is accommodated. The first fluid accommodation space may be surrounded by a first junction region in which the first cover and the second cover are bonded together. A penetration hole may be formed on the top of the first junction region.

A probe for the charging and discharging of a prismatic battery according to an embodiment of the present disclosure is a probe for charging and discharging of a prismatic battery, including a contact point unit disposed on one side of the probe and equipped, on one surface thereof, with an electrode part for providing a current to the prismatic battery, an expansion member disposed on another surface of the contact point unit and configured to expand when a fluid is introduced therein so that an electrode part comes into contact with an electrode of the prismatic battery, a support unit disposed on another side of the probe and configured to support the expansion member, and a connection unit coupled with the support unit configured to limit a moving direction of the expansion member.

Advantageous Effects

According to the present disclosure, the following effects may be obtained.

First, if an electrode of a battery is disposed on both sides of the battery which face each other, the battery can be charged and discharged in accordance with a location of the electrode.

Furthermore, since the expansion member is provided, an electrode of a battery can be charged and discharged without a separate pressurization apparatus for a contact with the electrode, such as a motor. Accordingly, space utilization can be improved because a space occupied by the motor for pressurization is obviated.

Furthermore, if a fluid is introduced into the expansion member, as the expansion member expands, the contact point unit comes into contact with an electrode of a battery. Accordingly, a pressure value of the contact point unit coming into contact with the electrode can be adjusted by adjusting the amount of the introduced fluid without replacing a separate part.

Furthermore, if a plurality of probes is fixed, more battery cells can be simultaneously charged and discharged because an interval between the probes can be more narrowed.

Effects of the present disclosure are not limited to the aforementioned effects, and effects not described above may be evidently understood from the following description by those skilled in the art.

DESCRIPTION OF DRAWINGS

FIG. 1 is a diagram illustrating a structure in which a probe for the charging and discharging of a prismatic battery according to the present disclosure is provided in plural and coupled with a plurality of batteries.

FIG. 2a is a perspective view of the probe for the charging and discharging of a prismatic battery according to the present disclosure.

FIG. 2b is an exploded perspective view of FIG. 2a.

FIG. 3a is a cross-sectional view of FIG. 2a.

FIG. 3b is a diagram illustrating the state in which a fluid has been introduced into an expansion member in FIG. 3a.

FIG. 4 is a perspective view illustrating that only the expansion member in FIG. 2a is separated and enlarged.

FIG. 5 is a cross-sectional view of a cutting part taken along line A-A in FIG. 4.

FIG. 6 is a side cross-sectional view of the expansion member in FIG. 4.

FIG. 7 is a cross-sectional view of a cutting part taken along line B-B in FIG. 4.

FIG. 8 is a cross-sectional view of FIG. 1.

FIG. 9 is a diagram illustrating the state in which a fluid has been introduced into the expansion member in FIG. 8.

FIG. 10 is a block diagram of a system including the probe for the charging and discharging of a prismatic battery according to the present disclosure.

FIG. 11 is a perspective view of a fixture including the probe for the charging and discharging of a prismatic battery according to the present disclosure.

FIG. 12 is a cross-sectional view of FIG. 11.

FIG. 13 is an enlarged perspective view of FIG. 11.

FIG. 14 is an enlarged perspective view of FIG. 11, which is viewed at another angle.

MODE FOR INVENTION

Advantages and characteristics of the present disclosure and a method for achieving the advantages and characteristics will become apparent from the embodiments described in detail in conjunction with the accompanying drawings. However, the present disclosure is not limited to the disclosed embodiments, but may be implemented in various different forms. The embodiments are provided to only complete the present disclosure and to fully notify a person having ordinary knowledge in the art to which the present disclosure pertains of the category of the present disclosure. The disclosure is defined by the category of the claims.

Terms used herein are used to describe specific embodiments and are not intended to limit the present disclosure. Furthermore, an expression of the singular number used in this specification may include an expression of the plural number unless clearly defined otherwise in the context.

The term "includes" and/or "including" used in this specification does not exclude the presence or addition of one or more other elements in addition to a mentioned element.

"and/or" used in this specification includes each of mentioned elements and all combinations of one or more of the mentioned elements. Although the terms "first", "second", etc. are used to describe various elements, these elements are not limited by these terms. These terms are merely used to distinguish between one element and another element. Accordingly, a first element mentioned hereinafter may be a second element within the technical spirit of the present disclosure.

A term "transverse direction" used in the following description means a front side, rear side, left or right direction in the state in which a position in the up or down direction is not changed. A term "perpendicular direction" used in the following description means the up or down direction in the state in which a position in the front side, rear side, left or right direction is not changed.

The drawings are merely for enabling the spirit of the present disclosure to be understood, and it should not be interpreted that the scope of the present disclosure is limited by the drawings. Furthermore, in the drawings, a relative thickness or length or a relative size may be enlarged for convenience and the clarity of description. The same reference numerals refer to the same elements throughout the specification.

Hereinafter, embodiments of the present disclosure are described in detail with reference to the accompanying drawings.

FIG. 1 is a diagram illustrating a structure in which a probe for the charging and discharging of a prismatic battery according to the present disclosure is provided in plural and coupled with a plurality of batteries 1.

Referring to FIG. 1, the structure in which the probe for the charging and discharging of a prismatic battery according to an embodiment of the present disclosure is coupled with the plurality of batteries includes the battery 1, a probe 10, and a battery accommodation unit 20.

An electrode of a conventional battery is disposed on the top of the battery, but an electrode of the battery 1 with which the probe 10 according to embodiments of the present disclosure comes into contact is disposed on both sides of the battery which face each other.

The battery accommodation unit 20 forms a space in which one or more batteries 1 can be accommodated, and further includes fitting units protruded toward the inside thereof on both sides of the battery which face each other. The probe 10 may be fitted and coupled to the fitting units.

FIG. 2a is a perspective view of the probe 10 for the charging and discharging of a prismatic battery according to the present disclosure. FIG. 2b is an exploded perspective view of FIG. 2a. FIG. 3a is a cross-sectional view of FIG. 2a. FIG. 3b is a diagram illustrating the state in which a fluid has been introduced into an expansion member 200 in FIG. 3a.

Referring to FIGS. 2a, 2b, 3a and 3b, the probe 10 includes a contact point unit 100, the expansion member 200, a support unit 300 and a connection unit 400.

The contact point unit 100 is disposed on one side of the probe 10. A current may be applied to the contact point unit 100 by a shunt 430. In this case, the one side means a position neighboring an electrode of the battery 1.

The contact point unit 100 comes into contact with the electrode of the battery 1 and supplies a current to the battery 1. The contact point unit 100 according to embodiments of the present disclosure selectively comes into contact with the electrode of the battery 1 depending on whether a fluid is introduced into the probe 10. The fluid may mean a gas or a liquid. For example, the fluid may be air.

The contact point unit 100 further includes an electrode part 110 and a guide hole 120.

The electrode part 110 is disposed on one surface of the contact point unit 100, and includes a pin insertion hole 111 and a voltage sensing pin 112. The electrode part 110 is connected to the shunt 430 in a way to electrically communicate with the shunt.

According to embodiments, the electrode part 110 may be formed by performing surface processing on one surface of the contact point unit 100. For example, the electrode part 110 may include a plurality of prominences and depressions formed on the contact point unit 100.

In order to prevent a short circuit in the electrode part 110, an insulation unit 130 is disposed between the contact point unit 100 and the expansion member 200.

One or more pin insertion holes 111 may be provided.

The voltage sensing pin 112 is configured to detect a voltage of the battery 1 and disposed within the pin insertion hole 111.

According to an illustrated embodiment, the voltage sensing pin 112 may be insulated from the electrode part 110. For example, the voltage sensing pin 112 is isolated from the pin insertion hole 111 and disposed within the pin insertion hole 111. An electric wire connected to the voltage sensing pin 112 is disposed within the insulation unit 130, so that the voltage sensing pin 112 can be insulated from the electrode part 110.

When the voltage sensing pin 112 detects a voltage of the battery 1, a controller 700 to be described later controls a power unit 500 to apply a current to the electrode part 110, and a detailed description thereof will be given later.

The guide hole 120 is provided to be coupled with one end of a guide part 410. One or more guide holes 120 may be formed, and are formed in accordance with the number and positions of the guide part 410.

A coupling member 411 of the guide part 410 may be protruded to the outside through one end of the guide part and fastened to the guide hole 120.

The guide hole 120 is formed in an area of the contact point unit 100 other than the electrode part 110. If the guide hole 120 is formed in the electrode part 110, charging and discharging efficiency of the battery 1 may be reduced because a contact area between the electrode of the battery 1 and the electrode part 110 is reduced.

Furthermore, in the illustrated embodiment, it is preferred that the guide hole 120 has an internal diameter reduced from the battery 1 to the expansion member 200. An external diameter of the coupling member 411 is formed in accordance with the internal diameter of the guide hole 120.

It is preferred that an external diameter of one end of the coupling member 411 is greater than an internal diameter of a portion close to the electrode of the battery 1 of the guide hole 120. In such a case, if a fluid leaks from the expansion member 200, the coupling member 411 may attract the contact point unit 100 so that the contact point unit 100 returns to a position before the fluid is introduced into the expansion member 200 because a restoring force of an elastic member (not illustrated) is directed toward a direction that becomes distant from the contact point unit 100.

The expansion member 200 is a structure for enabling the contact point unit 100 to expand and come into contact with the electrode of the battery 1 when a fluid is introduced therein, and is disposed on a surface opposite to a surface with which the electrode of the battery 1 of the contact point unit 100 comes into contact.

The support unit 300 is an element for supporting the expansion member 200, and is disposed on the other side of the probe 10. In this case, the other side means a position corresponding to the one side described in order to describe the position of the contact point unit 100.

The support unit 300 is configured to fix a part of the probe 10 coupled with the fitting unit 21 of the battery accommodation unit 20 to be described later.

The support unit 300 may include a given element for being coupled and fixed to the fitting unit 21 of the battery accommodation unit 20. For example, a screw or a bolt may correspond to the given element.

The connection unit 400 is an element coupled with the support unit 300 configured to limit a moving direction of the expansion member 200, and a detailed description thereof is given later.

FIG. 4 is a perspective view illustrating that only the expansion member 200 in FIG. 2a is separated and enlarged.

Referring to FIG. 4, the expansion member 200 further includes a fluid accommodation unit 210 and a fluid supply pipe 220.

The fluid accommodation unit 210 includes a space in which a fluid introduced into the expansion member 200 is stored, and may be made of an elastic material.

The fluid accommodation unit 210 further includes a first fluid accommodation part 211 and a second fluid accommodation part 212.

The first fluid accommodation part 211 is connected to the fluid supply pipe 220 to be described later and is configured to enable the inflow and outflow of a fluid through the fluid supply pipe 220.

The second fluid accommodation part 212 is disposed by being overlapped with the first fluid accommodation part 211.

The size of a cross-sectional area of the second fluid accommodation part 212 may be smaller than the size of a cross-sectional area of the first fluid accommodation part 211. Specifically, it is preferred that the size of the second fluid accommodation part 212 corresponds to the size of the electrode part 110 so that the electrode of the battery 1 and the electrode part 110 are closely brought into contact with each other.

Furthermore, a penetration hole 214 through which the coupling member 411 of the guide part 410 can pass is provided in the fluid accommodation unit 210.

The number of penetration holes 214 and a position where the penetration hole 214 is formed may be determined in accordance with the number and position of the guide part 410, and a detailed description thereof is given later.

The fluid supply pipe 220 is connected to the fluid accommodation unit 210 and configured to enable the inflow and outflow of a fluid in and from the fluid accommodation unit 210. Specifically, the fluid supply pipe 220 is connected to the first fluid accommodation part 211, so that a fluid flows in and out of the first fluid accommodation part 211.

The fluid supply pipe 220 is isolated from the penetration area of the penetration hole 214.

A fluid that flows in and out through the fluid supply pipe 220 may be air, for example, a non-conductive gas.

FIG. 5 is a cross-sectional view of a cutting part taken along line A-A in FIG. 4. FIG. 6 is a side cross-sectional view of the expansion member 200 in FIG. 4.

Referring to FIGS. 5 and 6, the first fluid accommodation part 211 forms a space in which a fluid may be introduced and stored, and further includes a first cover 2111 and a second cover 2112.

The first cover 2111 and the second cover 2112 are bonded together in a way to form a first fluid accommodation space 2113 in which a fluid may be accommodated.

The first fluid accommodation space 2113 is surrounded by a first junction region 2114 in which the first cover 2111 and the second cover 2112 are bonded together.

The second fluid accommodation part 212 communicates with the first fluid accommodation part 211, and is disposed to overlap the first fluid accommodation part 211. The second fluid accommodation part 212 further includes a third cover 2121 and a fourth cover 2122.

The third cover 2121 and the fourth cover 2122 are bonded together in a way to form a second fluid accommodation space 2123 in which a fluid may be accommodated.

The second fluid accommodation space 2123 is surrounded by a second junction region 2124 in which the third cover 2121 and the fourth cover 2122 are bonded together.

The penetration hole 214 is formed in the first junction region 2114 in which the first cover 2111 and the second cover 2112 are bonded together.

The penetration hole 214 may be formed in pair. It is preferred that a pair of penetration holes 214 is disposed to face each other with the first fluid accommodated space 2113 interposed therebetween.

Referring to FIGS. 4 and 5 together, the fluid supply pipe 220 may be buried in and fixed to the first junction region 2114.

If the fluid supply pipe 220 is fixed to the first junction region 2114, although a fluid is introduced into the fluid supply pipe 220, the fluid supply pipe 220 cannot be moved. Accordingly, the speed at which the fluid accommodation unit 210 is expanded can be predicted because the amount of a fluid introduced into the fluid accommodation unit 210 is constantly maintained.

If the fluid supply pipe 220 is not fixed to a specific location, when a fluid is introduced into the fluid supply pipe 220, the fluid supply pipe 220 may be moved. In this case, the amount of the fluid introduced into the fluid accommodation unit 210 may not be constant. Furthermore, if the fluid supply pipe 220 collides against another element while moving, an unexpected problem in that charging and discharging efficiency of the electrode of the battery 1 is reduced due to the expansion of the expansion member 200 to be described later may occur.

FIG. 7 is a cross-sectional view of a cutting part taken along line B-B in FIG. 4.

Referring to FIG. 7, the second fluid accommodation part 212 is coupled with the first fluid accommodation part 211 so that a fluid communicates with the second fluid accommodation part 212 and the first fluid accommodation part 211 through a fluid hole 213. Accordingly, when a fluid is introduced into the first fluid accommodation part 211, the fluid may be introduced into the second fluid accommodation part 212 through the fluid hole 213.

The fluid hole 213 has been described as being illustrated in a cross section corresponding to line B-B in FIG. 4, but embodiments of the present disclosure are not limited thereto. The fluid hole 213 may be formed in a given area between the first fluid accommodation part 211 and the second fluid accommodation part 212.

In the illustrated embodiment, the fluid supply pipe 220 is connected to the upper part of the first fluid accommodation part 211 and isolated from the penetration hole 214, but a position thereof is not essentially limited to the illustrated position.

FIG. 8 is a cross-sectional view of FIG. 1. FIG. 9 is a diagram illustrating the state in which a fluid has been introduced into the expansion member 200 in FIG. 8.

Referring to FIGS. 8 and 9, when air is introduced into the expansion member 200, one side of the expansion member 200 is expanded in a direction that becomes distant from the other side of the expansion member 200 in the state in which the other side of the expansion member 200 has been fixed by the support unit 300.

As one side of the expansion member 200 is expanded, the contact point unit 100 coming into contact with the expansion member 200 becomes distant from the expansion member 200. Accordingly, if a fluid is introduced into the expansion member 200 to the maximum, the electrode part 110 of the contact point unit 100 and the electrode of the battery 1 come into contact with each other. Accordingly, when a current flows into the electrode part 110 of the contact point unit 100, the battery 1 may be charged and discharged.

A pressure value of the contact point unit coming into contact with the electrode may be adjusted without replacing a separate part by adjusting the amount of a fluid introduced into the fluid accommodation unit 210 of the expansion member 200.

According to an embodiment of the present disclosure, the second fluid accommodation parts 212 may be disposed in parallel and connected to the first fluid accommodation part 211. A connection between the first fluid accommodation part 211 and the second fluid accommodation part 212 is performed by the fluid hole 213, and a description thereof has been given above and thus omitted. If the plurality of fluid accommodation units 210 is connected in parallel, pressure of the electrode part 110 of the contact point unit 100 which may be applied to the electrode of the battery 1 may be increased because the amount of a fluid accommodated in the fluid accommodation unit 210 is increased. Accordingly, there is an effect in that precise charging and discharging can be performed because the electrode of the battery 1 and one surface of the contact point unit 100 can be closely brought into contact with each other by strong pressure.

Furthermore, for a close contact, if a fluid is introduced into the expansion member 200 as described above and the contact point unit 100 becomes close to the electrode of the battery 1, it is preferred that a cross section of one surface of the contact point unit 100 is moved and maintained to be perpendicular to a moving direction of the contact point unit 100. To this end, the illustrated embodiments include the guide part 410, a guide support part 420, etc. The guide part 410, the guide support part 420, etc. are described in detail later.

Although the fluid accommodation unit 210 of the expansion member 200 includes only the first fluid accommodation part 211, as the first fluid accommodation part 2110 is expanded, the electrode part 110 of the contact point unit 100 and the electrode of the battery 1 may come into contact with each other.

The connection unit 400 is an element coupled with the support unit 300 and configured to limit a moving direction of the expansion member 200, and further includes the guide part 410, the guide support part 420 and the shunt 430.

The guide part 410 has one end coupled with the contact point unit 100 and the other end coupled with the support unit 300. One or more guide parts 410 may be provided.

The guide part 410 further includes the coupling member 411, a shaft 412 and an elastic member 413 therein.

The shaft 412 is provided within the guide part 410 and forms a center axis of the guide part 410 in the length direction thereof. The elastic member 413 is provided within the guide part 410 and provided in a form to surround the shaft 412. The coupling member 411 is coupled with one end of the shaft 412 and protruded to the outside of the guide part

410. A detailed description of an effect attributable to the coupling of the elastic member 413 and the coupling member 411 is given later.

The guide support part 420 includes a through hole 421 so that the guide part 410 can slide through the through hole 421 such that the moving direction of the guide part 410 is limited.

In the illustrated embodiment, when air is introduced into the expansion member 200 and the expansion member 200 is expanded toward the electrode of the battery 1, the contact point unit 100 also moves toward the electrode of the battery 1, and the guide part 410 connected to the contact point unit 100 also moves. At this time, the guide part 410 slides and moves along the through hole 421.

In contrast, when a fluid is discharged from the expansion member 200, the contact point unit 100 no longer moves toward the electrode of the battery 1. Since the guide part 410 returns to its original position by a restoring force of the elastic member 413 included in the guide part 410, the contact point unit 100 coupled with the guide part 410 is also detached from the electrode of the battery 1 and thus may return to its original position along the guide part 410.

The shunt 430 is formed in a curved form in which one side thereof is brought into contact and connected with the contact point unit 100 and the other side thereof is coupled with the support unit 300. The shunt 430 is flexibly configured. Accordingly, if the expansion member 200 is expanded due to the introduction of a fluid and the contact point unit 100 simultaneously moves toward the electrode of the battery 1, a shape of the shunt 430 may be deformed accordingly.

FIG. 10 is a block diagram of a system including the probe for the charging and discharging of a prismatic battery according to the present disclosure.

Referring to FIG. 10, the system including the probe for the charging and discharging of a prismatic battery includes the probe 10, the power unit 500, a fluid supply unit 600 and the controller 700.

The probe 10 is provided on both sides of each of one or more batteries 1 as described above, and may charge and discharge the batteries 1. The probe 10 further includes the contact point unit 100, the expansion member 200, the support unit 300 and the connection unit 400.

The probe 10 and the elements constituting the probe are the same as those described above, and a description thereof is omitted.

The power unit 500 may supply power to the probe 10. The power unit 500 may include a given element for power supply. The power supply is a well-known technology, and a detailed description thereof is omitted.

The fluid supply unit 600 may supply a fluid to the probe 10. The fluid supply unit 600 may include a given element for supplying a fluid.

The controller 700 may control the power supply of the power unit 500, and further includes a sensor unit 710. The controller 700 is connected to the sensor unit 710 in a way to electrically communicate therewith.

The sensor unit 710 is configured to detect voltage information of the battery 1 through the voltage sensing pin 112 provided in the electrode part 110, and is connected to the controller 700 in a way to electrically communicate therewith. A method of detecting a voltage is a well-known technology, and a detailed description thereof is omitted.

In this case, when the sensor unit 710 detects the voltage information, the controller 700 receives the voltage information and generates control information based on the received voltage information so that the power unit 500 supplies a current to the electrode part 110.

FIG. 11 is a perspective view of a fixture including the probe for the charging and discharging of a prismatic battery according to the present disclosure.

Referring to FIG. 11, the fixture including the probe for the charging and discharging of a prismatic battery includes the probe 10, a power cable 800 and a fluid manifold 900.

In the illustrated embodiment, the probe 10 is disposed in plural at given intervals. In this case, the support unit 300 and shunt 430 of the probe 10 are coupled and fixed to a frame 30. The probe 10 and the elements constituting the probe are the same as those described above, and a description thereof is omitted.

The frame 30 further includes a first frame 31 and a second frame 32, and a detailed description of the first frame 31 and the second frame 32 is given later.

The power cable 800 is an element for supplying a current to the probe 10. To this end, the power cable 800 is connected to the shunt 430 in a way to electrically communicate therewith.

The fluid manifold 900 is configured to supply a fluid to the probe 10, and is disposed in plural at given intervals. The fluid manifolds 900 are coupled and fixed to the frames 30.

FIG. 12 is a cross-sectional view of FIG. 11.

Referring to FIG. 12, the shunt 430 is coupled with the first frame 31. The support unit 300 is coupled with the second frame 32. The fluid manifold 900 to be described later is disposed on the top of the second frame 32.

FIG. 13 is an enlarged perspective view of FIG. 11.

Referring to FIG. 13, the probe 10 is disposed in plural at given intervals. A plurality of the shunts 430 is also coupled with the first frames 31, respectively, at given intervals.

Each of the shunts 430 may be coupled with the same surface of the first frame 31.

In this case, it is most preferred that a plurality of the shunts 430 is alternately coupled with surfaces of the first frames 31 which face each other. The power cable 800 is connected to the shunt 430 in a way to electrically communicate therewith as described above. In this case, the power cable 800 is thick so that a high voltage current can flow into the power cable 800. Accordingly, if the shunts 430 are coupled with only the same surfaces of the first frames 31, an installation interval between the probes 10 needs to be wide.

FIG. 14 is an enlarged perspective view of FIG. 11, which is viewed at another angle.

Referring to FIG. 14, the fluid manifold 900 is configured to supply a fluid to the probe 10. To this end, one end of a fluid cable (not illustrated) and the fluid manifold 900 are coupled together. Specifically, the fluid manifold 900 is configured to store a fluid introduced therein through the fluid cable (not illustrated) and to supply the stored fluid to each of the fluid supply pipes 220 of the plurality of probes 10. Accordingly, the expansion member 200 of the probe 10 may be expanded.

The fluid manifold 900 may be disposed in the second frame 32 at given intervals. In this case, surfaces of the fluid manifold 900 and another adjacent fluid manifold 900, which face each other, may be connected by a connection pipe 910. When a fluid is introduced into the fluid manifold 900 with which the fluid cable (not illustrated) is coupled, the fluid communicates with an adjacent fluid manifold 900 through the connection pipe 910.

The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of a right of the present disclosure.

[Description of reference numerals]

| | |
|---|---|
| 1: battery | 10: probe |
| 20: battery accommodation unit | 21: fitting unit |
| 30: frame | 31: first frame |
| 32: second frame | 100: contact point unit |
| 110: electrode part | 111: pin insertion hole |
| 112: voltage sensing pin | 120: guide hole |
| 130: insulation unit | 200: expansion member |
| 210: fluid accommodation unit | 211: first fluid accommodation part |
| 2111: first cover | 2112: second cover |
| 2113: first fluid accommodation space | |
| 2114: first junction region | 212: second fluid accommodation part |
| 2121: third cover | 2122: fourth cover |
| 2123: second fluid accommodation space | |
| 2124: second junction region | 213: fluid hole |
| 214: penetration hole | 220: fluid supply pipe |
| 300: support unit | 400: connection unit |
| 410: guide part | 411: coupling member |
| 412: shaft | 413: elastic member |
| 420: guide support part | 421: through hole |
| 430: shunt | 500: power unit |
| 600: fluid supply unit | 700: controller |
| 710: sensor unit | 800: power cable |
| 900: fluid manifold | 910: connection pipe |

The invention claimed is:

1. An expansion member for a probe for battery charging and discharging,
a first fluid accommodation part that includes a space in which a fluid is introduced and stored such that the first fluid accommodation part expands when the fluid is introduced therein; and
a fluid supply pipe equipped with a path along which the fluid is introduced and discharged and connected to the first fluid accommodation part,
wherein the first fluid accommodation part comprises a first cover and a second cover,
the first cover and the second cover are bonded together to form a first fluid accommodation space in which the fluid is accommodated,
the first fluid accommodation space is surrounded by a first junction region in which the first cover and the second cover are bonded together, and
a penetration hole is formed on a top of the first junction region.

2. The expansion member of claim 1, further comprising a second fluid accommodation part configured to communicate with the first fluid accommodation part and disposed to overlap the first fluid accommodation part,
wherein the second fluid accommodation part comprises a third cover and a fourth cover,
the third cover and the fourth cover are bonded together to form a second fluid accommodation space in which the fluid is accommodated, and
the second fluid accommodation space is surrounded by a second junction region in which the third cover and the fourth cover are bonded together.

3. The expansion member of claim 2, further comprising a fluid hole through which the first fluid accommodation part and the second fluid accommodation part communicate with each other.

4. The expansion member of claim 3, wherein the fluid hole is configured to introduce, into the second fluid accommodation space, the fluid introduced into the first fluid accommodation space.

5. The expansion member of claim 1, wherein:
the penetration hole is formed in plural, and
the penetration holes are disposed to face each other with the first fluid accommodation space interposed therebetween.

6. A probe for charging and discharging of a prismatic battery, comprising:
a contact point unit disposed on one side of the probe and equipped, on one surface thereof, with an electrode part for providing a current to the prismatic battery;
an expansion member disposed on another surface of the contact point unit and configured to expand when a fluid is introduced therein so that the electrode part comes into contact with an electrode of the prismatic battery;
a support unit disposed on another side of the probe and configured to support the expansion member; and
a connection unit coupled with the support unit and configured to limit a moving direction of the expansion member.

7. The probe of claim 6, wherein the expansion member further comprises:
a fluid accommodation unit in which the fluid introduced into the expansion member is stored; and
a fluid supply pipe connected to the fluid accommodation unit and provided to enable fluid to be introduced therein and discharged therefrom.

8. The probe of claim 7, wherein the fluid accommodation unit further comprises:
a first fluid accommodation part connected to the fluid supply pipe; and
a second fluid accommodation part coupled with the first fluid accommodation part and disposed to overlap the first fluid accommodation part.

9. The probe of claim 8, wherein a size of a cross-sectional area of the second fluid accommodation part is equal to or smaller than a size of a cross-sectional area of the first fluid accommodation part.

10. The probe of claim 6, wherein:
the electrode part comprises a pin insertion hole, and
the pin insertion hole is equipped with a voltage sensing pin for detecting a voltage of the prismatic battery.

11. The probe of claim 10, wherein an insulation unit is disposed between the contact point unit and the expansion member.

12. The probe of claim 10, wherein the connection unit further comprises:
a guide part having one end coupled with the contact point unit and another end coupled with the support unit; and
a guide support part having a through hole such that the guide part slide along the through hole.

13. The probe of claim 12, wherein:
the guide part further comprises an elastic member, a shaft and a coupling member therein, and
the coupling member is protruded to an outside through the one end of the guide part and coupled with the contact point unit through a guide hole provided in the contact point unit.

14. The probe of claim 13, wherein an external diameter of one end of the coupling member is greater than an external diameter of the guide hole.

15. The probe of claim 12, wherein:
the connection unit further comprises a shunt,
the shunt is formed in a curved form having one side come into contact with the contact point unit and another side coupled with the support unit, and
the shunt is connected to the electrode part in a way to electrically communicate therewith.

* * * * *